UNITED STATES PATENT OFFICE.

JOSEPH FOWLER, ROBERT K. SMITHER, AND JOHN C. ALLAN, OF BUFFALO, NEW YORK.

IMPROVEMENT IN BOUGIES.

Specification forming part of Letters Patent No. 183,388, dated October 17, 1876; application filed May 13, 1876.

*To all whom it may concern:*

Be it known that we, JOSEPH FOWLER, ROBERT K. SMITHER, and JOHN C. ALLAN, of Buffalo, in the county of Erie and State of New York, have invented new and useful Improvements in Bougies, of which the following is a full, clear, and exact description of the same, sufficient for those skilled in the art to which the invention pertains.

The invention consists more particularly in an improved compound or mixture for the manufacture of bougies, and in a coating for the same.

In carrying out our invention, we take of cocoa-butter, one pound, glycerate of starch and gum arabic or tragacanth, of each sufficient to give the proper consistency, pliability, and fusibility, and roll or divide into bougies of the required size.

For coating these bougies after they are in proper form, we take of gelatine, of fish-glue, or of glue, one pound, of water, ten pounds, or of about these proportions. We dissolve the gelatine or glue by heat in the water, and then dip the bougies into the warm solution and suspend until dry or firm.

It will be understood that this compound is not of itself a medicament. It serves the purposes for the application of any remedies which may be incorporated in it, and for dilating the urethra in stricture or gonorrhea.

Though we have specified some proportions, these need not be exactly adhered to, since they must vary with the climate and circumstances. That which may be suited to a cold climate would be unsuited to a hot, and the reverse.

These bougies are flexible, and are to be applied by introduction into the urethra, where, by the combined action of the heat of the body and the secretions, they are dissolved, and thereby the medicament is imparted to the urethra.

Their action is mechanical in its nature. They serve to distend the passage, and carry and gradually apply, as they melt, whatever medicines they contain.

Having thus described our invention, what we claim, and desire to secure by Letters Patent of the United States, is—

1. A flexible urethral bougie composed of gum arabic or tragacanth, glycerate of starch, and cocoa-butter, in substantially the proportions specified.

2. The glycerate of starch, as an ingredient of flexible urethral bougies.

3. A flexible urethral bougie, medicated or not, fusible at the temperature of the body, coated with glue or gelatine, medicated or not, as set forth.

JOSEPH FOWLER.
    ROBERT K. SMITHER.
    JOHN C. ALLAN.

In presence of—
 LYMAN M. BAKER,
 JAMES SHELDON, Jr.